(12) United States Patent
Wise

(10) Patent No.: US 12,185,816 B2
(45) Date of Patent: Jan. 7, 2025

(54) REPEATEDLY REFILLABLE AND REUSABLE CONTAINER

(71) Applicant: Robert Wise, Penngrove, CA (US)

(72) Inventor: Robert Wise, Penngrove, CA (US)

( * ) Notice: Subject to any disclaimer, the term of this patent is extended or adjusted under 35 U.S.C. 154(b) by 0 days.

(21) Appl. No.: 18/166,147

(22) Filed: Feb. 8, 2023

(65) Prior Publication Data

US 2024/0268536 A1 Aug. 15, 2024

Related U.S. Application Data

(63) Continuation-in-part of application No. 18/153,629, filed on Jan. 12, 2023, now Pat. No. 11,950,679, which is a continuation-in-part of application No. 17/837,890, filed on Jun. 10, 2022, now abandoned, which is a continuation-in-part of application No. 16/875,100, filed on May 15, 2020, now abandoned, which is a continuation-in-part of application No. 16/856,362, filed on Apr. 23, 2020, now Pat. No. 11,304,495, which is a continuation-in-part of application No. 16/855,361, filed on Apr. 22, 2020, now Pat. No. 11,317,698, which is a continuation-in-part of application No. 16/683,689, filed on Nov. 14, 2019, now Pat. No. 11,304,494, said application No. 18/153,629 is a continuation-in-part (Continued)

(51) Int. Cl.
*A45D 34/04* (2006.01)
*A45D 40/04* (2006.01)
*A45D 34/00* (2006.01)
*A45D 40/00* (2006.01)

(52) U.S. Cl.
CPC ........... *A45D 34/041* (2013.01); *A45D 40/04* (2013.01); *A45D 2034/005* (2013.01); *A45D 2040/0043* (2013.01); *A45D 2040/005* (2013.01)

(58) Field of Classification Search
CPC .................. A45D 34/041; A45D 40/04; A45D 2034/005; A45D 2040/005; A45D 2040/0043
See application file for complete search history.

(56) References Cited

U.S. PATENT DOCUMENTS 1,863,106 A 6/1932 Alexandre
1,904,364 A 4/1933 Fullmer
(Continued)

*Primary Examiner* — Jennifer C Chiang
(74) *Attorney, Agent, or Firm* — Argus Intellectual Enterprise, LLC; Daniel Enea; Jordan Sworen

(57) ABSTRACT

A repeatedly refillable and reusable container is provided. The repeatedly refillable and reusable container includes a dispenser body. The dispenser body has a formed end with sides protruding therefrom, forming a receptacle accessible via an aperture. The receptacle of the dispenser body is designed to conjoin with a material refill unit by removing an enclosure apparatus and allowing the material refill unit to couple to, refill, and dispense the material of the material refill unit. When the material of the conforming material refill unit coupled with the dispenser body is dispensed, and the material refill unit is removed, a replacement material refill unit may be coupled to the dispenser body. Whereby the coupling of the material refill unit to the dispenser body refills the dispenser rendering the dispenser body reusable by the removal of the exhausted material refill unit.

15 Claims, 8 Drawing Sheets

Related U.S. Application Data of application No. 17/837,491, filed on Jun. 10, 2022, which is a continuation of application No. 16/875,100, filed on May 15, 2020, now abandoned, said application No. 18/153,629 is a continuation-in-part of application No. 17/506,942, filed on Oct. 21, 2021, which is a continuation of application No. 17/018,826, filed on Sep. 11, 2020, now abandoned, which is a continuation of application No. 16/875,100, filed on May 15, 2020, now abandoned.

(60) Provisional application No. 63/427,244, filed on Nov. 22, 2022.

(56) References Cited

U.S. PATENT DOCUMENTS

| | | | |
|---|---|---|---|
| 2,471,852 A | 5/1949 | Gordon | |
| 2,632,193 A | 3/1953 | Gilchrist | |
| 3,111,703 A | 11/1963 | George | |
| 3,212,120 A | 10/1965 | Gentile | |
| 3,913,595 A | 10/1975 | Grisel | |
| 4,140,411 A | 2/1979 | Harbauer et al. | |
| 4,277,194 A | 7/1981 | Smith | |
| 4,343,460 A | 8/1982 | Gende | |
| 4,359,292 A | 11/1982 | Thompson et al. | |
| 4,388,011 A | 6/1983 | Smith | |
| 4,605,330 A | 8/1986 | Crowley et al. | |
| 4,702,398 A | 10/1987 | Seager | |
| 4,932,802 A | 6/1990 | Cantone | |
| 5,255,990 A | 10/1993 | Dornbusch et al. | |
| 5,505,041 A | 4/1996 | Harlan | |
| 5,547,302 A | 8/1996 | Dornbusch et al. | |
| 5,829,976 A | 11/1998 | Green | |
| 5,833,382 A | 11/1998 | Jenks et al. | |
| 5,947,621 A | 9/1999 | Szekely | |
| 6,269,982 B1 | 8/2001 | Kreiseder et al. | |
| 7,708,169 B1 | 5/2010 | Szoke, Jr. | |
| 8,919,617 B2 | 12/2014 | Foley | |
| 9,872,551 B2 | 1/2018 | Swaile et al. | |
| 10,278,473 B2 * | 5/2019 | Groffsky | A45D 33/04 |
| 10,743,636 B2 * | 8/2020 | Bushell | A45D 40/04 |
| 11,033,091 B2 | 6/2021 | Wiesenthal et al. | |
| 11,109,658 B1 | 9/2021 | Khodzhayan | |
| 11,490,708 B2 * | 11/2022 | Groffsky | B65D 83/0038 |
| 11,517,098 B2 * | 12/2022 | Nolan | A45D 40/14 |
| 2004/0005186 A1 | 1/2004 | Ueda et al. | |
| 2004/0120756 A1 | 6/2004 | Cheng | |
| 2006/0018704 A1 | 1/2006 | Baines et al. | |
| 2006/0029455 A1 | 2/2006 | Baines et al. | |
| 2006/0065673 A1 | 3/2006 | Miyazaki et al. | |
| 2006/0076370 A1 | 4/2006 | Etesse | |
| 2006/0222445 A1 | 10/2006 | Chuang | |
| 2007/0014625 A1 | 1/2007 | Delage | |
| 2008/0050168 A1 | 2/2008 | Groh et al. | |
| 2008/0107475 A1 | 5/2008 | Wojcik et al. | |
| 2013/0170886 A1 | 7/2013 | Thulin et al. | |
| 2014/0286689 A1 | 9/2014 | Jung | |
| 2016/0157580 A1 | 6/2016 | Crawford et al. | |
| 2016/0174687 A1 | 6/2016 | Ellsworth | |
| 2018/0086542 A1 | 3/2018 | Ellsworth et al. | |
| 2018/0249808 A1 | 9/2018 | Crawford et al. | |
| 2018/0249809 A1 | 9/2018 | Crawford et al. | |
| 2018/0295968 A1 | 10/2018 | Groffsky et al. | |
| 2021/0061533 A1 | 3/2021 | Chen | |
| 2021/0137243 A1 | 5/2021 | Nolan et al. | |
| 2021/0289918 A1 | 9/2021 | Thulin et al. | |
| 2022/0395077 A1 * | 12/2022 | Chen | A45D 40/16 |

* cited by examiner

REPEATEDLY REFILLABLE AND REUSABLE CONTAINER

CROSS REFERENCE TO RELATED APPLICATIONS

This application claims the benefit of U.S. Provisional application Ser. No. 17/506,942 filed on Oct. 21, 2021 which is a continuation-in-part of U.S. patent application Ser. No. 16/856,362, filed on Apr. 23, 2020, which is a continuation-in-part of U.S. patent application Ser. No. 16/855,361 filed on Apr. 22, 2020, which is a continuation-in-part of U.S. patent application Ser. No. 16/683,689 filed on Nov. 14, 2019. The above identified patent application is herein incorporated by reference in its entirety to provide continuity of disclosure.

BACKGROUND OF THE INVENTION

The present invention relates to a repeatedly refillable and reusable container. More specifically, the present invention provides a reusable container that includes an enhanced interior volume to surface area ratio, such that a relatively higher amount of material can be stored therein.

A large number of humans use deodorant, or similar spreadable substances every day. These substances often come in plastic canisters. These canisters are meant to be used once then tossed aside. While these canisters are functional and inexpensive, they also create waste.

Plastic takes decades to decompose and all the while takes space in landfills. The trash issue in our planet is starting to reach critical levels as more and more things are made to be disposable. Items such as canisters take up even more room due to the nature of having the canister having an interior volume to hold a solution which is dispensed through the usage of the consumable product. Due to the number of canisters used these items account for a significant amount of landfill.

Consequently, there is a need in for an improvement in the art of dispenser housings in order to provide for waste reduction. The present invention substantially diverges in design elements from the known art while at the same time solves a problem many people face when using dispensers to apply substances to a desired surface, such as an individual's body. In this regard the present invention substantially fulfills these needs.

SUMMARY OF THE INVENTION

In view of the foregoing disadvantages inherent in the known types of reusable containers now present in the prior art, the present invention provides a repeatedly refillable and reusable container wherein the same can be utilized for providing convenience for the user when refilling a container.

The present system comprises a dispenser body. The dispenser body has a formed end with sides protruding therefrom, forming a receptacle that is accessible via an aperture. The receptacle of the dispenser body is configured to conjoin with a material refill unit by removing an enclosure apparatus thereof, allowing the material refill unit to couple to, refill, and dispense the material of the material refill unit. When the material of the material refill unit is coupled with the dispenser body and the material refill unit is removed, a replacement material refill unit can be coupled to the dispenser body.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
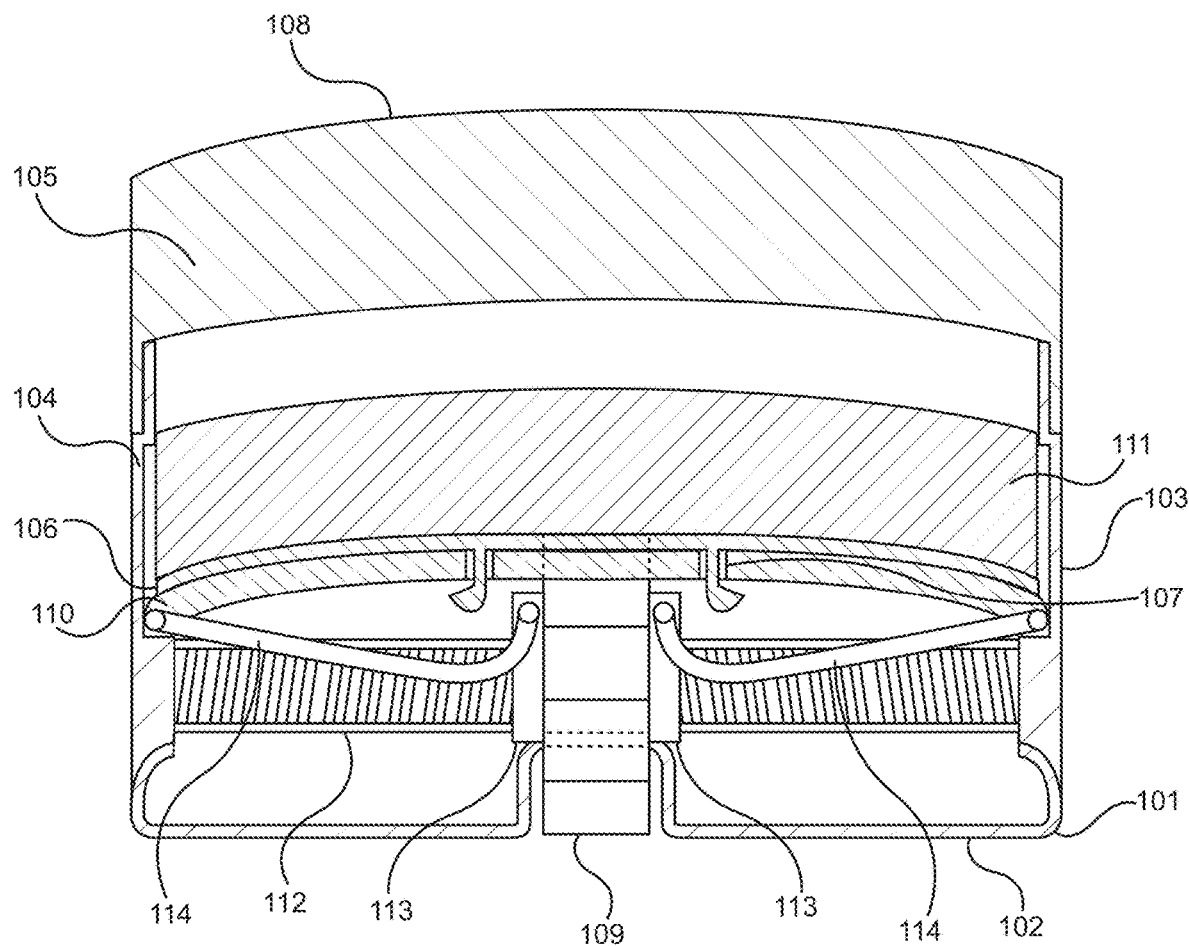
FIG. 1 shows a cross-sectional view of an embodiment of the repeatedly refillable and reusable container.

Reference is made herein to the attached drawings. Like reference numerals are used throughout the drawings to depict like or similar elements of the repeatedly refillable and reusable container. The figures are intended for representative purposes only and should not be considered to be limiting in any respect.

Figure 2:
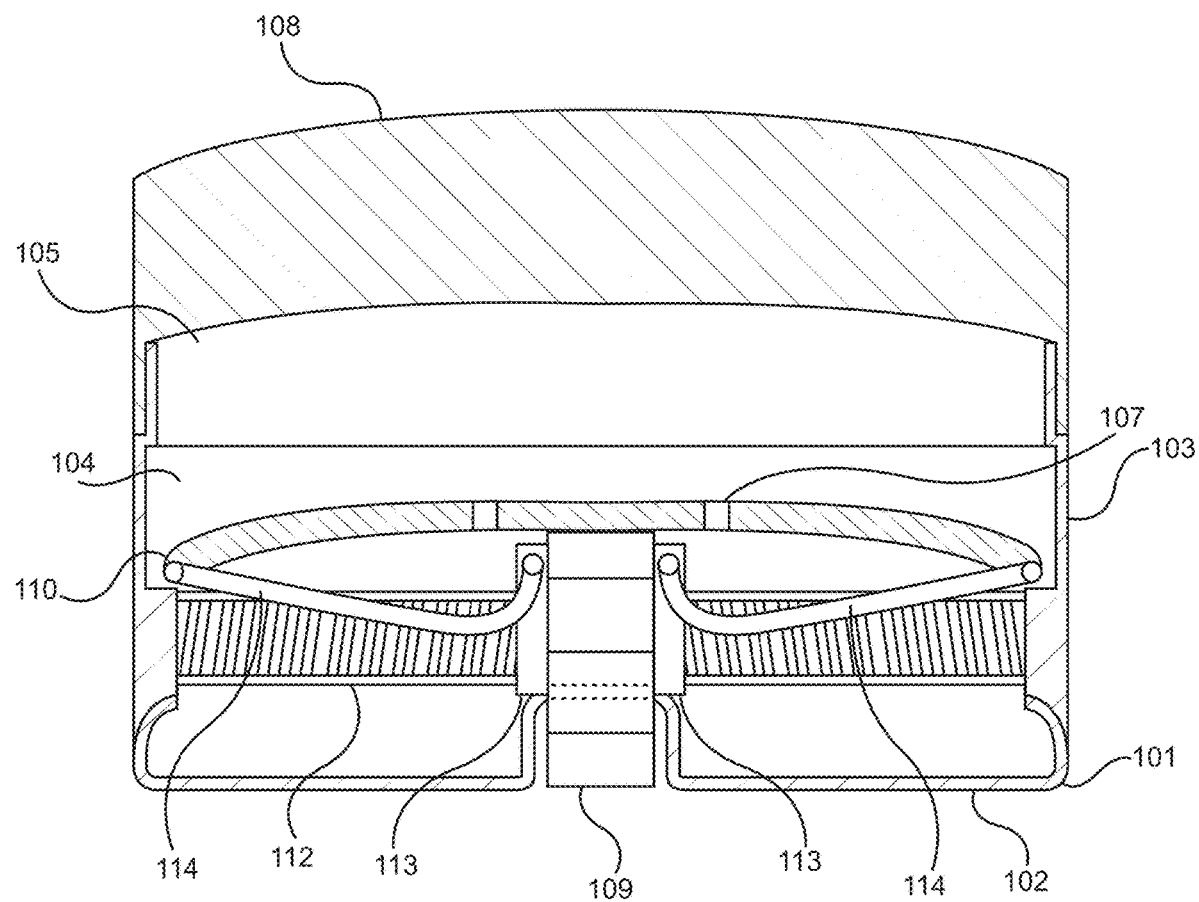
FIG. 2 shows a cross-sectional view of an embodiment of the repeatedly refillable and reusable container.

Referring now to FIGS. 1 and 2, there are shown a cross-sectional views of an embodiment of the repeatedly refillable and reusable container. The repeatedly refillable and reusable container comprises a dispenser body 101. The dispenser body 101 comprises a formed end 102 with sides 103 protruding therefrom. The sides form a receptacle 104. The receptacle 104 is accessible via an aperture 105. In the illustrated embodiment, the aperture 105 is disposed opposite the formed end 102 of the dispenser body 101. In some embodiments, at least one component of the dispenser body 101 is made of a biodegradable, compostable material.

The receptacle 104 of the dispenser body 101 is configured to conjoin with a material refill unit 106. The material refill unit 106 can be conjoined with the receptacle 104 of the dispenser body 101 when the enclosure apparatus 108 is removed. The enclosure apparatus 108 is configured to be removably affixed over the aperture 105 of the dispenser body 101, such as to prevent contamination of the materials within the receptacle 104 of the dispenser body 101. In some embodiments, at least one component of the material refill unit 106 is made from a new or recycled material including plastic, metal, bonded cellulose, cellulose pulp, organic matter, Poly Vinyl Alcohol, Poly Vinyl Succinate, Butene Diol Vinyl Alcohol Co-Polymers, Biodegradable Polymers, or any combination thereof.

The removal of a material refill unit 106 from the receptacle 104 of the dispenser body 101 allows for the insertion of a new material refill unit into the receptacle 104 of the dispenser body 101. As such, the repeatedly refillable and reusable dispenser will be able to be reused as one material refill unit becomes exhausted or otherwise expires. In the illustrated embodiment, the material refill unit 106 is configured to conjoin with a mating device 107 disposed within the receptacle 104 of the dispenser body 101.

Figure 3:
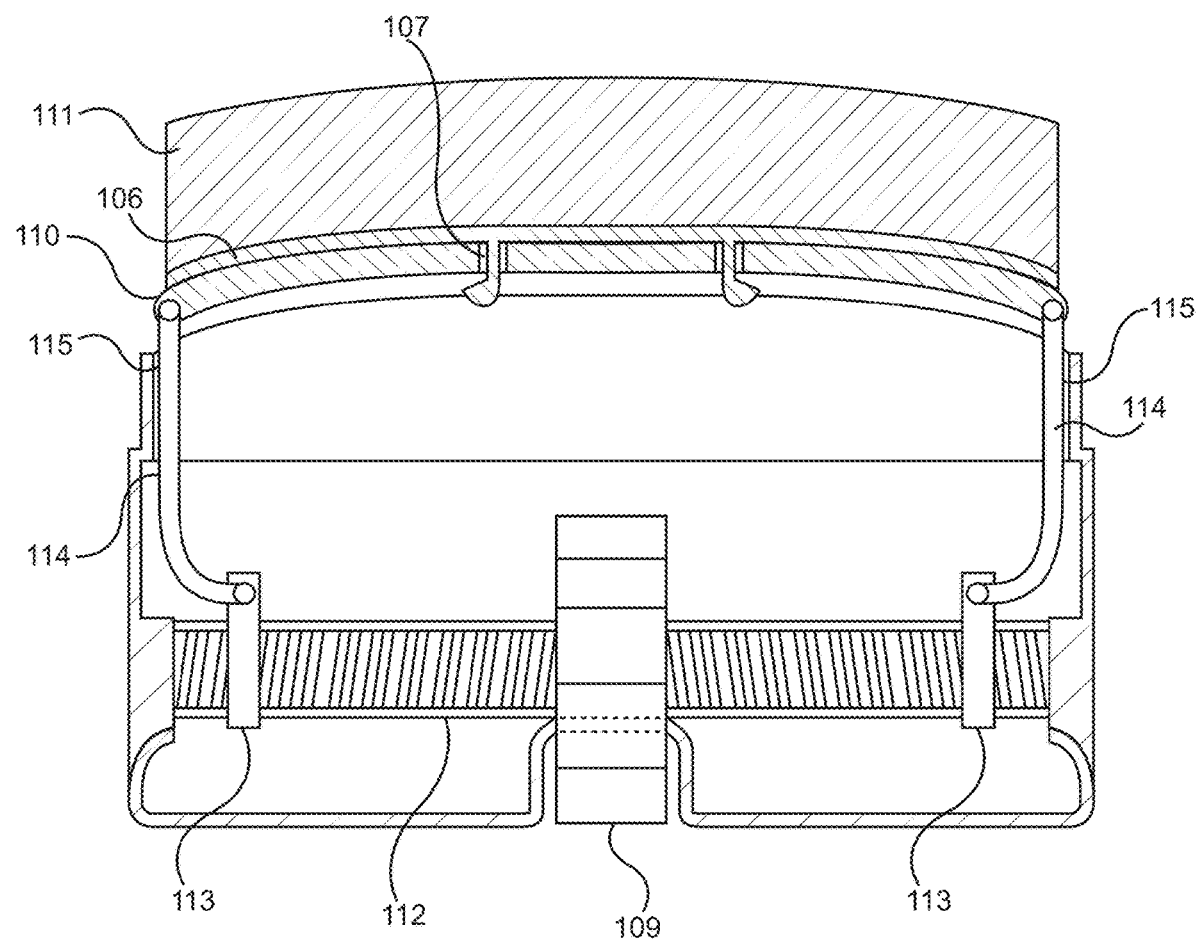
FIG. 3 shows a cross-sectional view of an embodiment of the repeatedly refillable and reusable container in use.

In some embodiments, the repeatedly refillable and reusable dispenser further comprises a lift apparatus component. In the illustrated embodiment, the mating device 107 is in operable connection with the lift apparatus component. The lift apparatus component is disposed in the receptacle 104 of the dispenser body 101 where the material refill unit 106 is to be coupled. The lift mechanism component is in operable connection with an actuator 109. The actuator 109 is connected to the lift mechanism such that engaging the actuator 109 will elevate the lift component, as shown in FIG. 3.

In the illustrated embodiment, the lift mechanism comprises a base 110. The base 110 is configured to couple with the material refill unit 106. As such, the base 110 will be able to press the material 111 of the material refill unit 106 through the aperture 105 of the dispenser body 101. Furthermore, in the illustrated embodiment, the lift mechanism comprises a shaft 112. The shaft 112 is in operable connection with the actuator 109, such that movement of the actuator 109 causes corresponding movement of the shaft 112, causing the material 111 of the material refill unit 106 to move either towards or away from the aperture 105 of the dispenser body 101.

In the illustrated embodiment, the shaft 112 is in operable connection with one or more movable pivot devices 113. As such, movement of the actuator 109 causes inward and outward movement of each pivot device 113 causing one or more pivotally connected mechanisms, such as yokes 114, to raise and lower the base 110 coupled to the lift mechanism. As such, a rising movement of the lift mechanism aligns the base 110 of the lift mechanism about the aperture 105 of the dispenser body 101 so to uncouple a coupling device 107 of an exhausted material refill unit 106, then couple a new conforming material refill unit to the base 110 via mating coupling devices 107.

In the illustrated embodiment, the lift mechanism is disposed within the receptacle 104 of the dispenser body 101, such that the lift mechanism includes components that are intertwined within the formed end 102 of the dispenser body 101, thereby minimizing the vertical height of the lift mechanism within the receptacle 104 of the dispenser body 101. For example, the components of the lift mechanism may be situated in the formed end 102 of the dispenser body 101 such that the lift mechanism coupled with the coupler device of the material refill unit 106, both having apertures about the actuator 109 enabling the lift mechanism with coupler devices to rest low within the dispenser body 101 enabling more material 111 within the receptacle 104.

In some embodiments, the material refill unit 106 is encased in an enclosure apparatus encapsulating the material of the conforming material refill unit, composed at least partially of a formed paper, cellulose, or other compostable material. Additionally, in some embodiments, the enclosure apparatus is temporarily attached to the conforming material refill unit, whereby removal thereof allows at least some components of the conforming material refill unit to be coupled to the base 110 of the dispenser body so to refill and dispense the material. Furthermore, in some embodiments, at least one component of the material refill unit 106 is dissolvable in a solvent. In other embodiments, the material refill unit 106 comprises a dispensing aperture exposed by removing a seal apparatus 106A, allowing the coupling of the conforming material refill within the unit, on, in or with the base 110 of the dispenser body 101, so to dispense the material of the refill unit via the dispenser body.

Referring now to FIG. 3, there is shown a cross-sectional view of an embodiment of the repeatedly refillable and reusable container in use. In some embodiments, the repeatedly refillable and reusable dispenser further comprises one or more vertical members 115. The vertical members 115 are disposed within the receptacle 104 of the dispenser body 101 and affixed to an inner side of a perimeter of the dispenser body 101. As such, the vertical members will vertically reinforce a material of the material refill unit 106 during application of the material 111, minimizing detachment of the material refill unit 106 to the mating coupling device 107 of the base 110.

In the illustrated embodiment, the material refill unit 106, upon removal of the enclosure apparatus (108 in FIGS. 1 and 2), affixes to the open top end of the dispenser body 101, by means of a protrusion 116 that engages passages 107 defined by the base 110 of the lift mechanism. As such, the attachments will allow the contents of the material refill unit 106 to be cinched to the dispenser body 101 by engaging corresponding protrusions 116 via the passages 107 so as to secure the cap in a minimal rotation allowing refill of the material refill unit 106 with the dispenser body 101.

Figure 4:
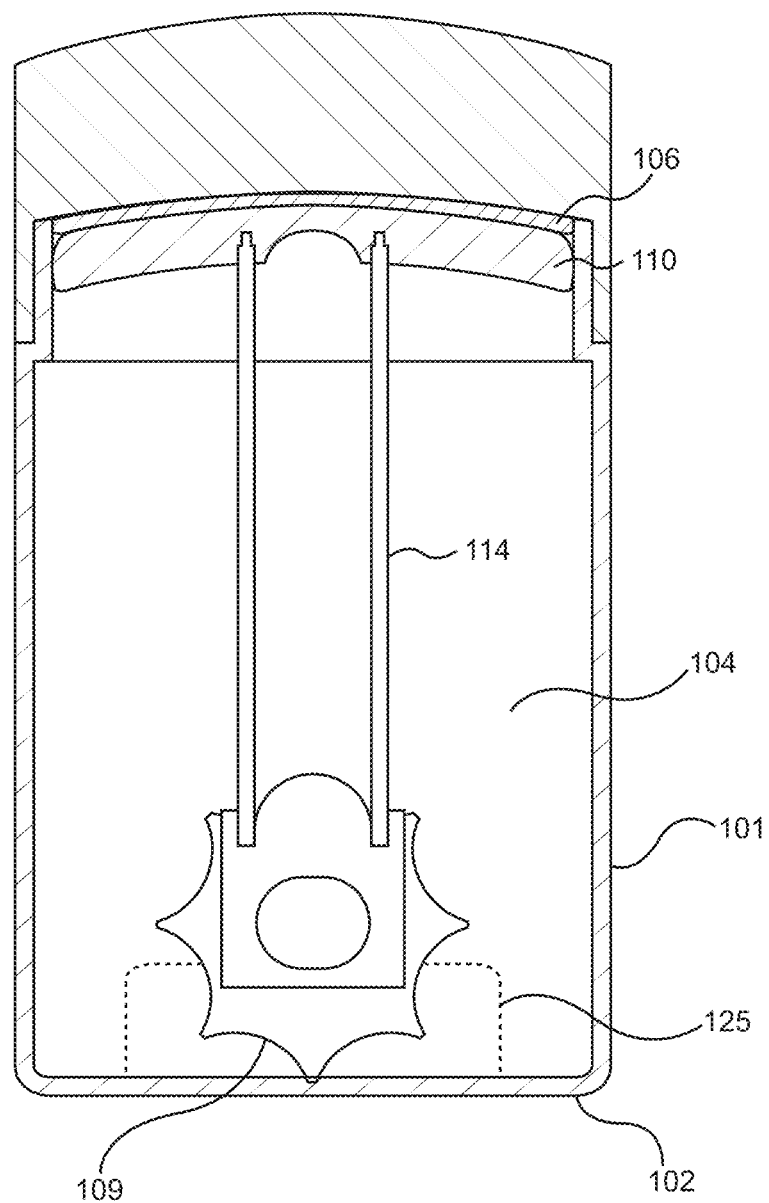
FIG. 4 shows a cross-sectional side view of an embodiment of the repeatedly refillable and reusable container.

Referring now to FIG. 4, there is shown a cross-sectional side view of an embodiment of the repeatedly refillable and reusable container. The actuator 109 is selected from the group consisting of an operable dial, a knurled dial, a push plate, a ratchet, a lever, a button, a knob, a push bar, and a spline. The actuator 109 is operable from the external area of the receptacle 104 of the dispenser body 101. In the illustrated embodiment, the actuator 109 is a dial that is accessible via a cut out 125 in the formed end 102 of the dispenser body 101.

Figure 5:
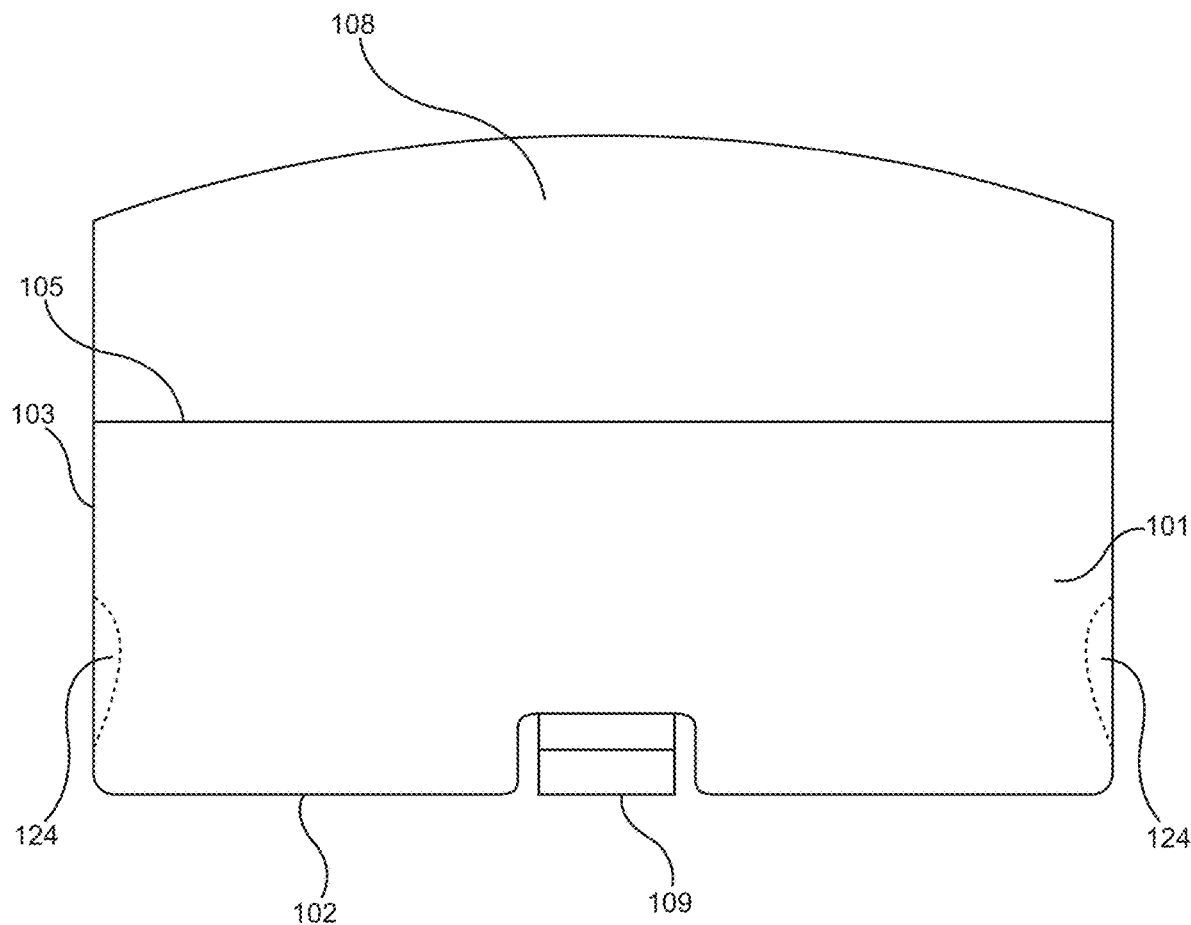
FIG. 5 shows a perspective view of an embodiment of the repeatedly refillable and reusable container.

Referring now to FIG. 5, there is shown a perspective view of an embodiment of the repeatedly refillable and reusable container. In the illustrated embodiment, the repeatedly refillable and reusable dispenser further comprising recesses 124 disposed on an exterior of the sides 103 of the dispenser body 101. The recesses 124 provide for added grip using a thumb on one side and fingers or knuckles on the opposite side within the recesses 124, enhancing the grip of the dispenser body 101.

Figure 6:
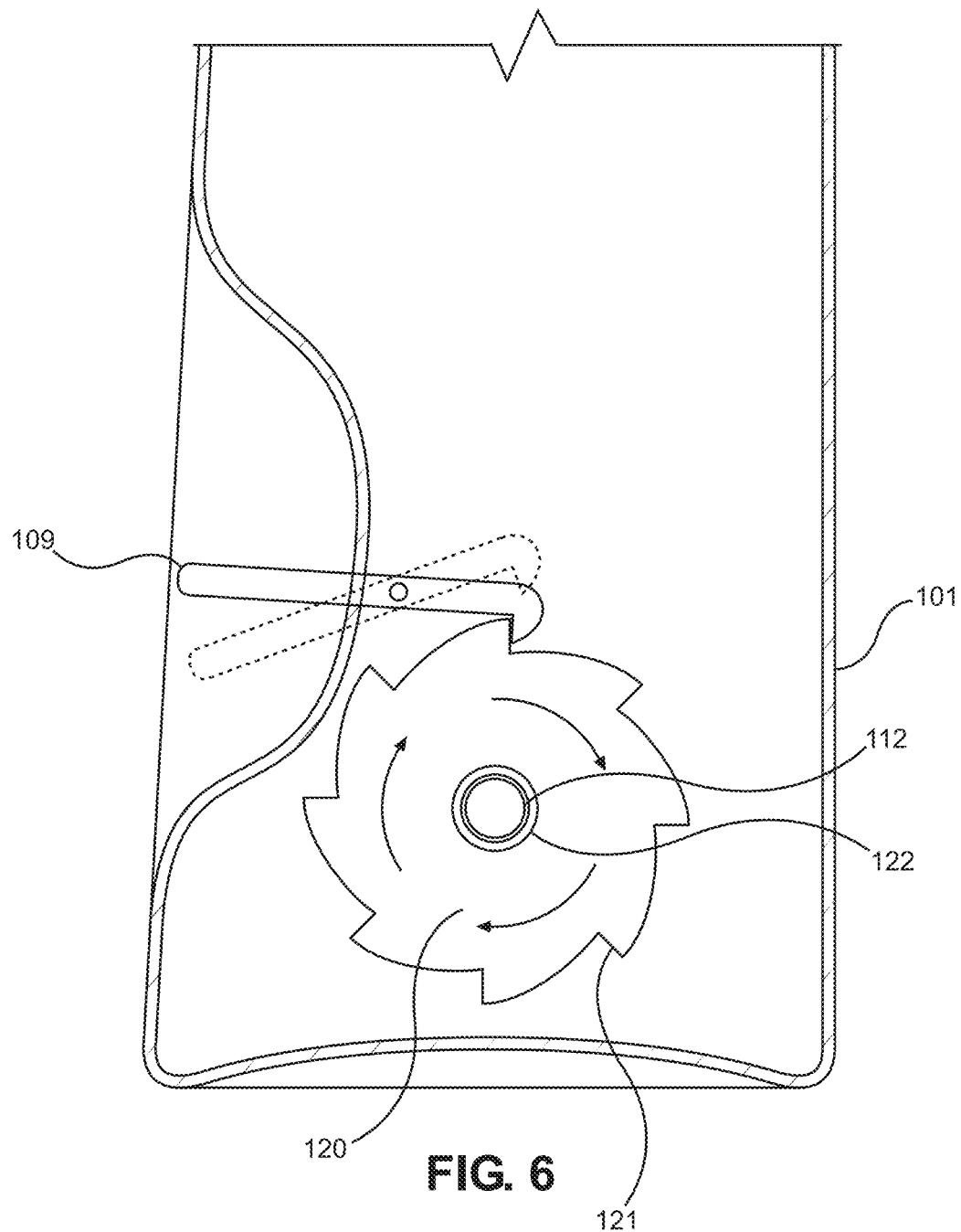
FIG. 6 shows a side view of an embodiment of the repeatedly refillable and reusable container.

Referring now to FIG. 6, there is shown a side view of an embodiment of the repeatedly refillable and reusable container. In the illustrated embodiment, the actuator 109 is in operable connection with dial 120 which further comprises a sprocket with cogs 121, whereby activation of the actuator 109 allows incremental movement of one or more threaded shafts 112 operably connected to the dial 120, thereby enabling the lift mechanism to rise within the receptacle of the dispenser body 101. As shown, the dial 120 comprises one or more threaded shafts 112 having a spring 122 providing spring tension so to rotate and cause the lift mechanism to rise upon activation of the actuator 109. The spring 122 causes the lift mechanism to automatically rise, as each cog 121 is released when activation of the actuator 109 (shown as an external control lever) causes the lift mechanism to recoil into the interior volume of the dispenser body 101 upon a conforming refill material unit being coupled and inserted into the dispenser body 101.

Figure 7A:
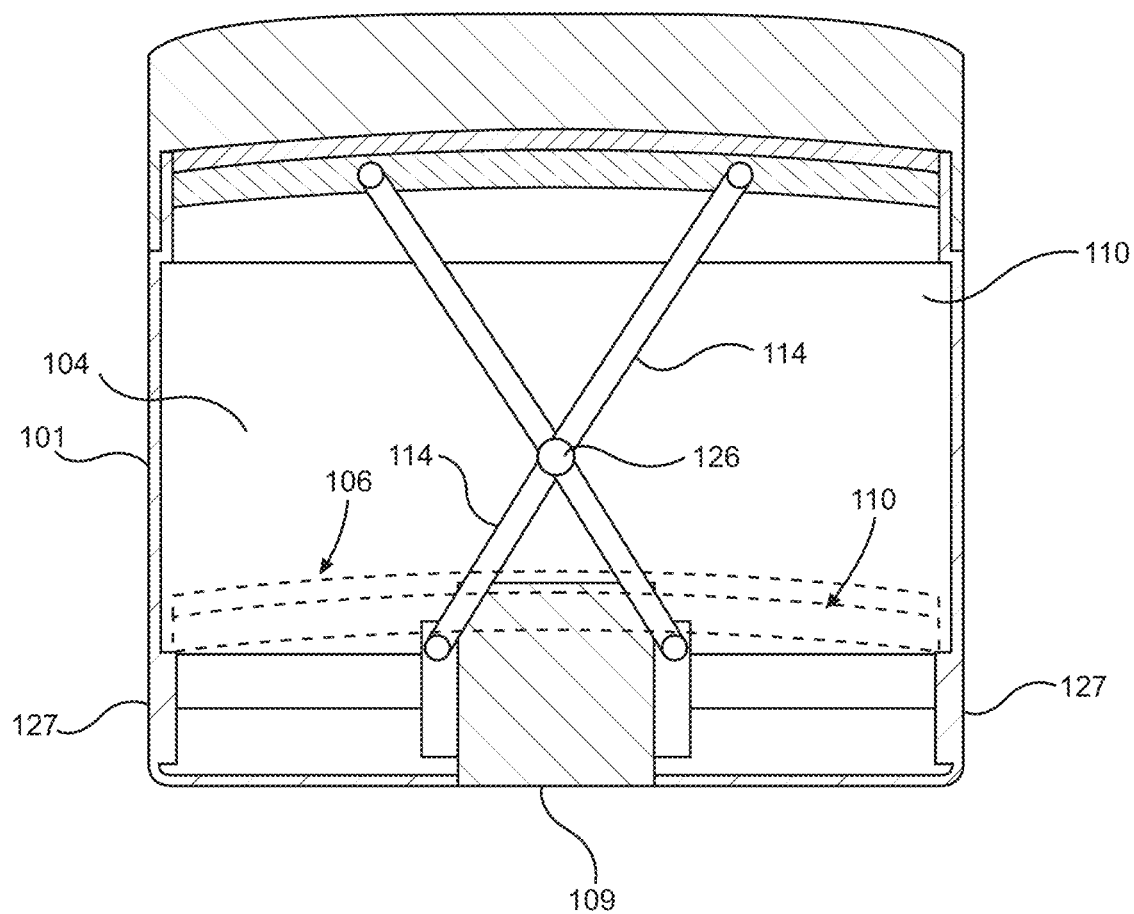
FIG. 7A shows a cross-sectional view of an embodiment of the repeatedly refillable and reusable container.
Figure 7B:
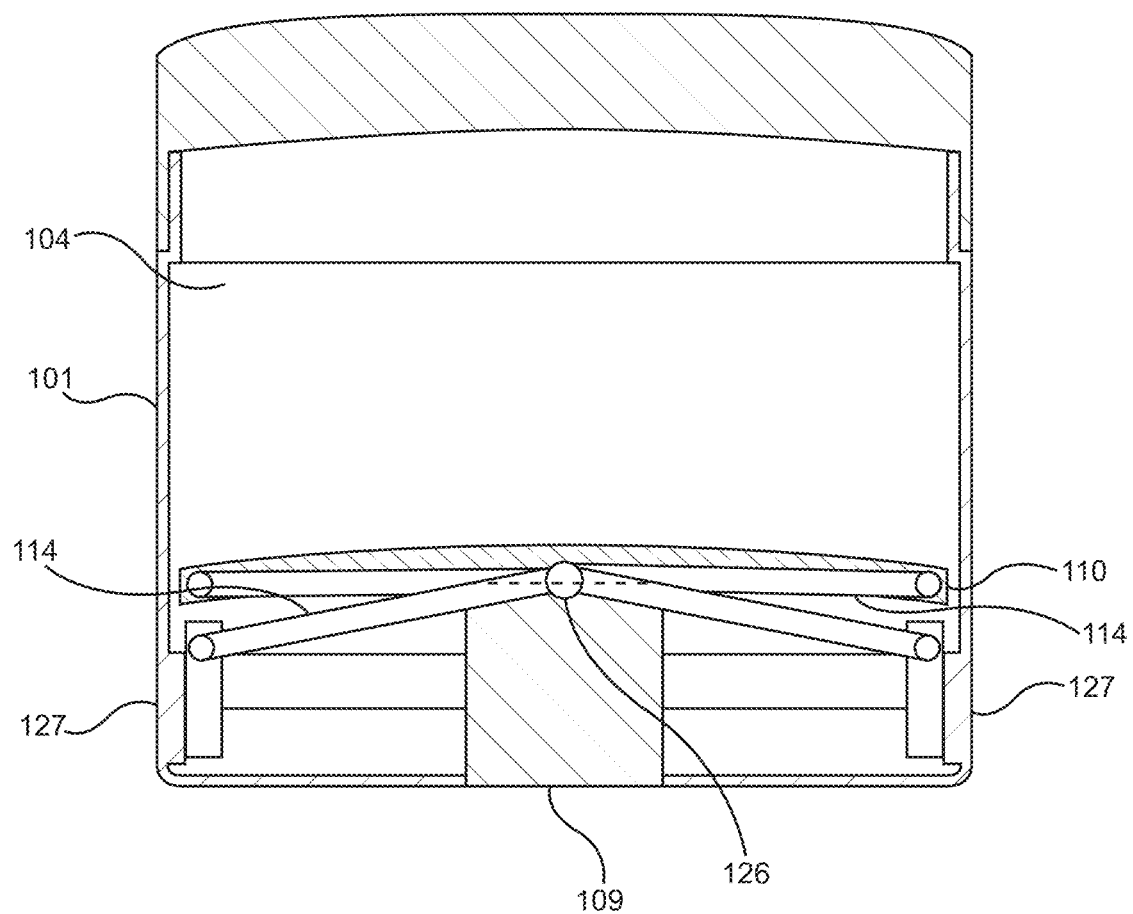
FIG. 7B shows a cross-sectional view of an embodiment of the repeatedly refillable and reusable container.

Referring now to FIGS. 7A and 7B, there are shown cross-sectional views of an embodiment of the repeatedly refillable and reusable container. In the illustrated embodiment, the lift mechanism is intertwined on either side of the actuator 109, wherein the lift mechanism includes elongated pivoting yokes 114 having a pivot 126 towards a center of the receptacle 104 of the dispenser body 101, which extends the elevation of the lift base 110 within the dispenser body 101, as the moveable pivot blocks move inward, allowing added volume of material within, on or in the dispenser body receptacle. In some embodiments, the lift mechanism components and actuator 109 comprise a single unit that is received through an aperture 105 of the dispenser body 101, with a means of conjoining within the receptacle 104 of the dispenser body 101. In the illustrated embodiment, the actuator 109 and lift mechanism snap into a pair of saddles 127 disposed on opposing sides of the dispenser body 101.

The repeatedly refillable and reusable dispenser may be made of any suitable material. In one embodiment, at least one component is made with a biodegradable compostable material. In another embodiment, at least one component is made with a water dissolving material. Additionally, at least one component may be made of a new or recycled material selected from the group consisting of plastic, metal, organic compound, cellulose, bonded paper and a combination thereof.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A repeatedly refillable and reusable dispenser, comprising:
    a dispenser body having a formed end with sides protruding therefrom, whereby a receptacle accessible via an aperture of the open end of the dispenser body;
    the receptacle of the dispenser body is configured to couple with a conforming material refill unit by removing an enclosure apparatus thereof allowing the conforming material refill unit to couple to, refill, and dispense a material of the conforming material refill unit;
    whereby when the material of the conforming material refill unit coupled with the receptacle of the dispenser is dispensed, all or part of the conforming material refill unit is removed, and a replacement conforming material refill unit is coupled to the receptacle;
    wherein the conforming material refill unit comprises the aperture of the dispenser body exposed by removing a seal apparatus, allowing coupling of the conforming material within the conforming material refill unit, on, in or with a mating attachment base of the dispenser body, so to dispense the material of the conforming material refill unit via the dispenser body;
    wherein the conforming material refill unit is coupled with the receptacle of the dispenser body;
    whereby the coupling thereof refills the dispenser rendering the dispenser body reusable by removal of conforming exhausted material refill unit; and
    wherein a rising movement of a lift mechanism aligns a lift base of the lift mechanism about the aperture of the dispenser body so to uncouple a coupling device of the exhausted conforming material refill unit, then couple the replacement material refill unit to the lift base via one or more mating coupling devices.

2. The repeatedly refillable and reusable dispenser of claim 1, wherein an actuator comprises a shaft coupled to one or more moveable devices, wherein movement of the actuator causes inward and outward movement of each of the one or more moveable devices causing one or more pivotally connected mechanisms to raise and lower a lift base coupled to a lift mechanism.

3. The repeatedly refillable and reusable dispenser of claim 1, further comprising one or more vertical members disposed within an interior volume of the dispenser body affixed to an inner side of a perimeter of the dispenser body, so to vertically reinforce the material during application, minimizing detachment of the material to the coupling device of the conforming material refill unit.

4. The repeatedly refillable and reusable dispenser of claim 1, wherein at least one component of the conforming material refill unit includes a new or recycled material selected from the group consisting of plastic, metal, bonded cellulose, cellulose pulp, organic matter, Poly Vinyl Alcohol, Poly Vinyl Succinate, Butene Dial Vinyl Alcohol Co-Polymers, Biodegradable Polymers, or any combination thereof.

5. The repeatedly refillable and reusable dispenser body of claim 1, wherein conforming material refill unit, upon removal of the units enclosure apparatus, affixes to the open top end of the dispenser body, by means for protrusion engaging via passages, allowing the contents of the conforming material refill unit to be cinched to the dispenser body by engaging corresponding prongs via the passages so to secure a cap in a minimal rotation allowing refill of the conforming material refill unit with the dispenser body.

6. The repeatedly refillable and reusable dispenser of claim 1, wherein the actuator includes a threaded shaft coupled with one or more moveable pivot devices moveably attached thereto, whereby movement of the actuator causes the one or more moveable pivot devices to move along one or more threaded shafts, which causes one or more support yokes connected to the one or more moveable pivot devices to raise and lower.

7. The repeatedly refillable and reusable dispenser of claim 6, wherein the one or more support yokes are coupled to the one or more moveable pivot devices on one end and a lift base on an opposite end, wherein the support yokes enable the lift base to rise and align through the aperture of the dispenser body enabling the uncoupling of the exhausted material refill unit then coupling a full material refill unit, retracting the material refill unit into the dispenser body receptacle.

8. The repeatedly refillable and reusable dispenser of claim 7, wherein coupling of the coupling device of the conforming material refill unit to the coupling device in, on or about the dispenser body temporarily engages the conforming material refill unit to the lift base within the dispenser.

9. The repeatedly refillable and reusable dispenser of claim 8, wherein the lift mechanism is disposed within an interior volume of the dispenser body, such that the lift mechanism includes components that are intertwined within the lift base of the dispenser body, thereby minimizing a vertical height of the lift mechanism within the interior volume of the dispenser body.

10. The repeatedly refillable and reusable dispenser of claim 9, wherein the components of the lift mechanism are situated in the lift base of the dispenser body such that the lift mechanism coupled with a coupler device of the material refill unit, both having an aperture about the actuator mechanism enabling the lift mechanism with coupler devices to rest low within the dispenser enabling more of the material within the dispenser body receptacle.

11. The repeatedly refillable and reusable dispenser of claim 1, wherein the actuator comprises a dial which further comprises a sprocket with cogs, wherein activation of an external control mechanism allows incremental movement of one or more threaded shafts operably connected to the dial, thereby enabling the lift mechanism to rise within the interior volume of the dispenser body.

12. The repeatedly refillable and reusable dispenser of claim 11, wherein the dial comprises the one or more threaded shafts having a spring providing spring tension so to rotate and cause the lift mechanism to rise upon activation of the external control mechanism.

13. The repeatedly refillable and reusable dispenser of claim 12, wherein the spring causes the lift mechanism to automatically rise, as each cog is released when activation of the external control mechanism lever causes the lift mechanism to recoil into the interior volume of the dispenser body upon the conforming refill material unit is coupled and inserted into the dispenser body.

14. The repeatedly refillable and reusable dispenser of claim 1, wherein the lift mechanism is intertwined on either side of the actuator, wherein the lift mechanism includes elongated pivoting yokes having a pivot towards a center of the interior volume of the dispenser body, which extends the elevation of the lift base within the dispenser body, as the moveable pivot blocks move inward, allowing added volume of material within, on or in the dispenser body receptacle.

15. The repeatedly refillable and reusable dispenser of claim 1, wherein the lift mechanism components and the actuator comprises the material refill unit that is received through the aperture of the dispenser body base, with a means for conjoining within the dispenser body receptacle.

* * * * *